United States Patent [19]

Lindner et al.

[11] Patent Number: 4,798,269
[45] Date of Patent: Jan. 17, 1989

[54] DIRECT LEVER ACTING SOLENOID RELEASED BRAKE MECHANISM

[75] Inventors: Bernard J. Lindner, Waukesha; Harold Lorenz, Greenfield, both of Wis.

[73] Assignee: PT Components, Inc., Indianapolis, Ind.

[21] Appl. No.: 893,694

[22] Filed: Aug. 6, 1986

[51] Int. Cl.⁴ ............... B60T 13/04; F16D 11/06; H02K 7/10; H02P 3/00

[52] U.S. Cl. .................. 188/171; 188/71.7; 188/72.9; 192/70.29; 310/77; 318/372

[58] Field of Search ............ 188/163, 166, 171, 71.7, 188/72.3, 72.9, 73.38; 192/70.24, 70.29, 90, 93 B; 310/77; 318/372, 370

[56] References Cited

U.S. PATENT DOCUMENTS

| | | | |
|---|---|---|---|
| 2,217,464 | 10/1940 | Arnold | 310/77 X |
| 3,171,515 | 3/1965 | Wolfe | 188/171 |
| 3,289,797 | 12/1966 | Brzezinski et al. | 188/171 |
| 3,525,424 | 8/1970 | McCarthy | 188/171 |
| 4,117,912 | 10/1978 | Ruppe, Jr. | 188/72.3 X |
| 4,142,610 | 3/1979 | Alexander et al. | 188/171 X |
| 4,181,201 | 1/1980 | McCarthy | 188/171 |
| 4,445,596 | 5/1984 | Waters et al. | 188/171 |

Primary Examiner—Douglas C. Butler
Assistant Examiner—Robert J. Oberleitner
Attorney, Agent, or Firm—Robert A. Brown

[57] ABSTRACT

A brake mechanism is disclosed wherein a support lever is pivoted at a pivot end to a stationary bearing plate and is urged by a plurality of springs, which engage the support lever radially inwardly from its pivot end, toward the end plate to effect clamping of a rotatable friction disc between the end plate and a brake shoe disposed near the pivot end of the support lever. A solenoid has a plunger pivotally connected directly to a bracket end of the support lever adapted to overcome the forces applied by the springs and release the brake when the solenoid is energized. The springs apply pressure in close proximity to the pivot point and with the solenoid being disposed at the remote free end of the support lever, there are achieved greater mechanical advantages without the need for complicated linkage assemblies. The arrangement of parts is such that the solenoid mechanical advantage is substantially 7 to 1, while the spring-set mechanical advantage is approximately 7 ½ to 1. The greater spring-set mechanical advantage ensures that the support lever always maintains contact with the stationary bearing plate.

30 Claims, 1 Drawing Sheet

DIRECT LEVER ACTING SOLENOID RELEASED BRAKE MECHANISM

BACKGROUND OF THE INVENTION

The present invention relates generally to a brake mechanism for motors or the like, and more particularly to spring set, magnetically released brakes in which a rotatable disc secured to a shaft is clamped by spring pressure between two non-rotating surfaces to effect a braking action that prevents or stops angular motion of the shaft. Braking action clamping pressure is disabled and released by energizing an electromagnetic device, such as a solenoid, which usually occurs at the moment power is applied to the driving motor. The plunger of the solenoid pulls against a simple lever mechanism which overcomes the spring clamping pressure and allows the disc and shaft to rotate.

Brakes of this type are common in the power transmission industry and a study of the state of the art reveals that most all employ the same general principles. A number of prior art references point out the use of solenoid plunger motion to overcome spring pressure directly without the aid of a mechanical advantage. Such implementation requires employment of large solenoid coils and brings about problems relating to space, weight, heat, cost, and the like.

Other inventions resort to the use of complex systems of gears, cams and/or linkages to gain high mechanical advantages and thus permit the use of smaller solenoid coils. Obtaining a high mechanical advantage is not without some disadvantage, however, in that reactive, reverse direction forces require the action of gravity to return the solenoid plunger to a de-energized position As a result, there is imposed a severe restriction on orientation of the brake when mounted on a frame or motor. These structures inherently necessitate the use of a greater number of parts that are subject to wear, failure and frequent adJustment. In addition, because of the complex arrangement of assembled components, these and other parts are more difficult to replace after Wear or failure. In addition, as these parts wear, they become illfitted and more prone to backlash, rattle and production of objectionable noise Various attempts to solve the problems of the prior art have been made and are illustrated in a number of U.S. patents, including U.S. Pat. Nos. 3,500,971; 3,525,424; and 3,556,266. In addition, U.S. Pat. No. 4,181,201 owned by the assignee of the present invention discloses a brake mechanism wherein a solenoid is mounted o a support lever that is connected to a cam pivoted to a end plate and adapted to contact the support lever near its free end to overcome the force of a spring and release the brake when the solenoid is energized. The arrangement of the many parts provides a solenoid mechanical advantage in the neighborhood of 24-32 to 1. The spring mechanical advantage varies considerably from the ratio of the present invention and is in the order of 8½ to 1.

SUMMARY OF THE INVENTION

The brake mechanism of the present invention is associated with a motor driven shaft journaled in a frame or housing and is provided for stopping the shaft when the power to the motor is interrupted. The brake mechanism includes a rotatable brake disc secured to the shaft. A support lever is pivoted at one end to a stationary bearing plate secured to an end plate which is attached to a motor that drives the shaft. An anchored resilient means engages the support lever radially inwardly from the pivot point for urging the lever to pivot in one direction and the solenoid connected to the support lever at its other end is effective to urge the lever in the other direction when the solenoid is energized. The resilient means and the solenoid are disposed on the lever in a manner wherein the resilient means urges the lever toward the end plate and the solenoid urges the lever away from the end plate. A non-rotatable brake shoe is mounted immediately adjacent the pivot point of the lever and is contacted by an abutment means on the lever near its pivot point for engaging and clamping the friction disc between the end plate and the brake shoe when the lever is pivoted toward the end plate and releasing clamping engagement when the lever is pivoted away from the end plate.

The brake mechanism is preferably a spring set, magnetically released brake provided for stopping the shaft of a motor when the motor and solenoid are simultaneously de-energized. The brake mechanism is also arranged to provide adequate mechanical advantage, but permit the use of less expensive solenoids and springs than those used on prior art devices. A single independent adjustment means is provided to compensate for wear of friction surfaces and for adjusting the brake applying torque. Various ranges of torque ratings are achieved by interchanging springs and solenoid coils. Torque may be decreased to substantially 50% of normal rating by increasing the spring length by outwardly positioning the locknuts that hold the springs in compression. Noise suppression is accomplished by a hub stabilizing spring that eliminates backlash noise between the hub and the friction disc and by an anti-rattle leaf spring that urges the brake shoe off and away from the friction disc so that no chattering occurs therebetween.

Accordingly, it is a primary object of the present invention to provide a spring set, magnetically released brake mechanism having a brake released mechanical advantage of substantially 7 to 1.

It is a further object of the present invention to provide a brake mechanism having a spring set mechanical advantage of about 7½ to 1.

A further object of the present invention is to provide a brake mechanism utilizing a low mechanical advantage that avoids excessive wear of parts by eliminating moving linkage wear parts.

Another object of the present invention is to provide a brake mechanism having a wide range of torque ratings by using a minimum number of associative parts.

An additional object of the present invention is to provide a brake mechanism having a single non-interacting adjustment means to compensate for wear and adjustment of torque.

Still another object of the present invention is to provide a brake mechanism which is easily serviced so that replacement of the friction disc can be accomplished without brake disassembly.

It is still another object of the present invention to provide a brake mechanism having manual release means that maintains braking surfaces in disengagement during absence of power, but will automatically re-set upon application of power to permit normal braking operation.

A further object of the present invention is to provide a brake mechanism having hub stabilizing means to suppress noise caused by backlash between shaft hub and friction disc.

It is still another object of the present invention to provide a brake mechanism having anti-rattle leaf spring means to suppress noise caused by intermittent non-braking contact between brake shoe and friction disc.

An improved spring actuated, solenoid released brake mechanism in accordance with the present invention comprises friction disc means secured to a motor shaft for rotation therewith, end plate means secured to a motor frame and having a disc engaging braking surface, non-rotatable brake shoe means mounted for movement toward and away from said disc, bearing plate means secured to said end plate means on an outermost circumferential surface thereof, support lever means having one end pivotally abutting against said bearing plate means, compression spring means disposed adjacent said one end of said support lever means for urging said lever means against said bearing plate means, adjustment means disposed adjacent said one end of said support lever means having an inner end urging said brake shoe means against said friction disc means, and a solenoid secured to said end plate means on an outermost circumferential surface thereof diametrically opposite from said bearing plate means and having reciprocally movable plunger means pivotally connected to said support lever means at its other end, whereby energization of said solenoid is effective to permit rotation of said shaft and deenergization of said solenoid is effective to stop rotation of said shaft.

DESCRIPTION OF THE DRAWING

The foregoing and other characteristics, objects, features and advantages of the present invention will become more apparent upon consideration of the following detailed description, having reference to the accompanying drawings, wherein.

DESCRIPTION OF A PREFERRED EMBODIMENT

Figure 1:
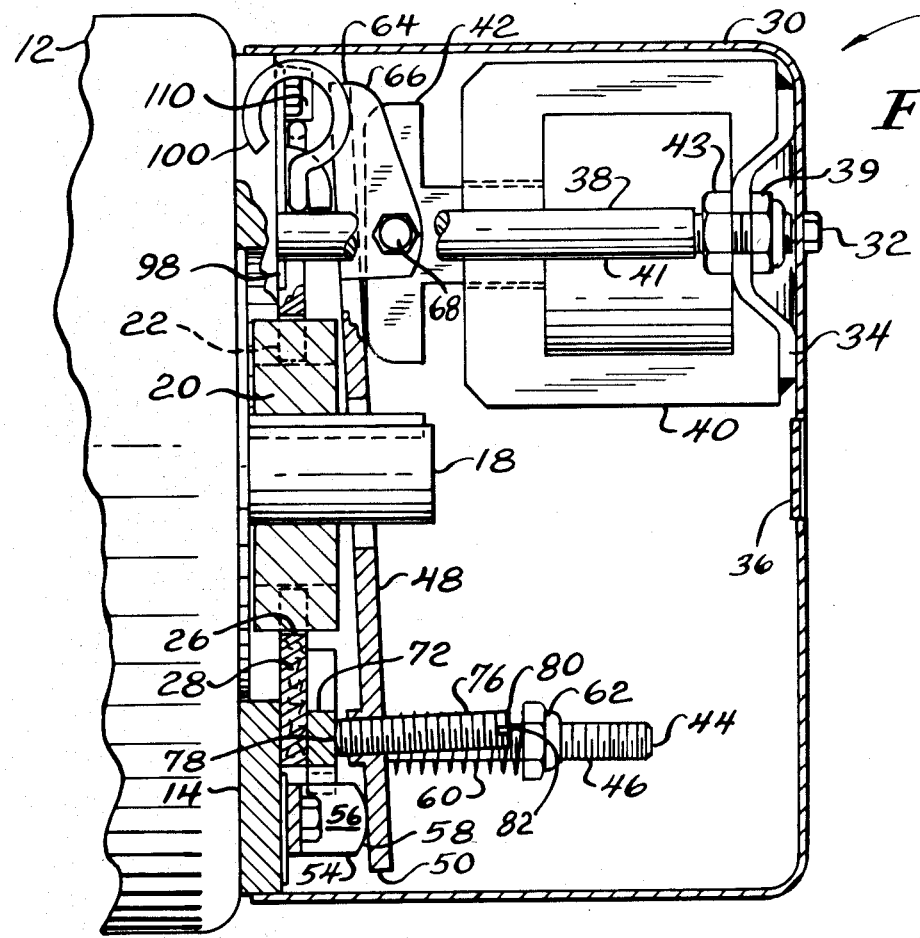
FIG. 1 is a sectional view of the present invention taken through a central section along lines 1—1 of FIG. 2. This view includes a non-sectioned shaft and associated motor which is shown for purposes of illustration but is not a component of the subject invention.
Figure 3:
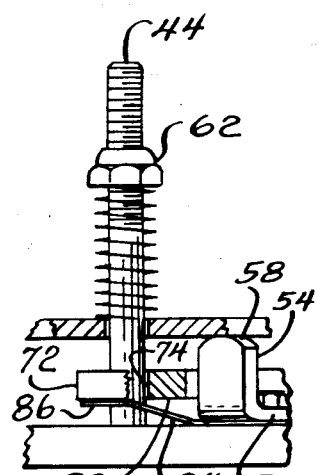
FIG. 3 is a fragmentary view of a portion of the brake mechanism taken along lines 3—3 of FIG. 2 showing one of two pressure springs and spring stud, a brake shoe, an anti-rattle leaf spring, a lever arm and its pivot point.
Figure 2:
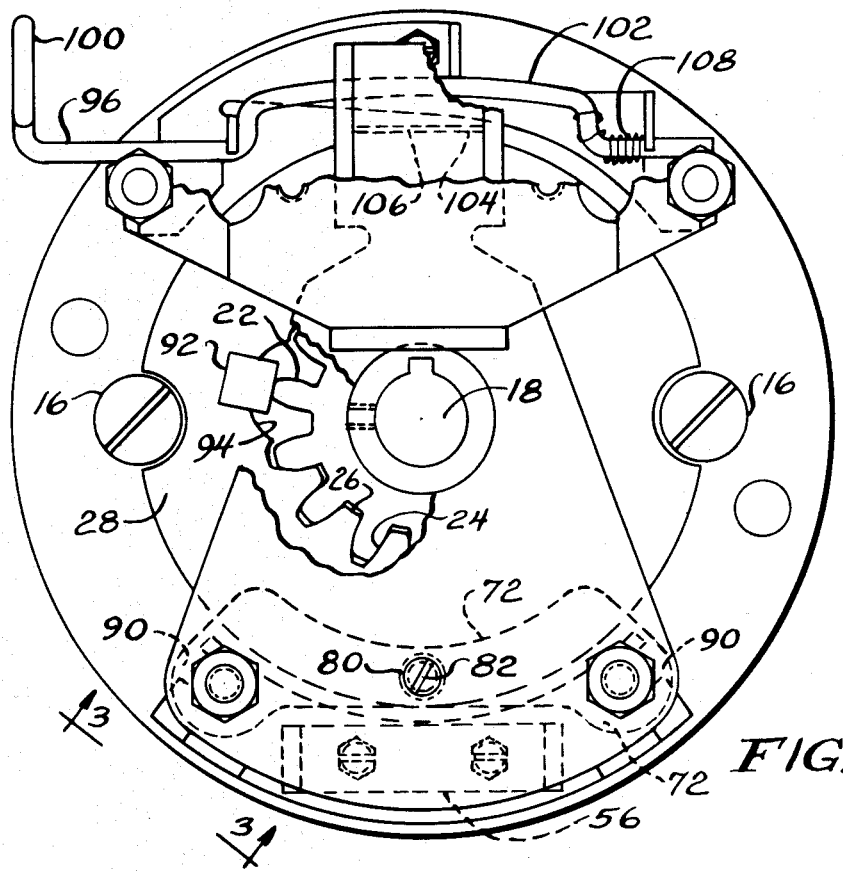
FIG. 2 is a vertical sectional view of the invention taken along lines 2—2 of FIG. 1 showing a protective cover removed and with a portion of the solenoid mounting bracket cut away to show details of the manual release arm.

Referring to the several views of the drawing wherein like parts are identified by like reference numerals, a spring set, magnetically released friction type brake mechanism, generally identified by reference numeral 10 is mounted on a motor 12. The brake 10 comprises an end plate 14, mounted in a known manner by cap screws 16 to .the motor 12 or other prime mover that operates a rotatable shaft 18. Disposed about and keyed to or otherwise secured to the shaft 18 is a hub 20 (or other connecting means, such as block means) having located on its outer peripheral circumferential surface a plurality of teeth 22 for cooperating with and fitting into complementary shaped recesses 24 formed in an inner aperture 26 of a rotatable axially slidable brake friction disc 28. The friction disc 28 has a pair of semicircularly shaped cutouts on its peripheral surface to allow access to the plurality of brake mounting screws 16 that attach the end plate 14 to the motor 12. Longitudinal movement of the hub 20 along shaft 18 is prevented by means of a common set screw installed in a threaded opening in the periphery of the hub 20 and tightened against the circumferential surface of the shaft 18 in a manner that is common to these applications. The shaft 18, hub 20 and friction disc 28 rotate as an integral unit when rotated by the motor 12.

The brake 10 is fitted with a cylindrical protective cover plate housing 30 to prevent entry of foreign substances which could reduce the effectiveness of the mechanism. The housing 30 is secured to the brake 10 by a pair of cap screws 32 which extend through openings in the installed cover 30 and engage threaded openings disposed in a solenoid mounting bracket 34. The cover 30 contains an indentation 36 commonly known as a "knock out" which can be removed to allow the shaft 18 to extend through the cover for various purposes, such as attachment to a tachometer, position encoder or similar device.

Although not shown specifically, it should be noted that other openings can be provided as required to accommodate brake and/or motor wiring and that these openings ca be fitted with grommets, conduit couplings or the like to prevent abrasion of wire insulation. The inside surface of the cover 30 could also be coated with a sponge-like material or other acoustical absorbent means to accomplish significant noise reduction.

A plurality of solenoid mounting studs 38 are secured to and extend outwardly from the end plate 14 and have mounted thereon the solenoid mounting bracket 34 secured thereat by locknuts 39. A solenoid 40 is welded or otherwise suitably secured to the bracket 34 and includes a reciprocal plunger 42 extending forwardly toward the end plate 14. This arrangement permits the brake mechanism 10 to be mounted on the motor frame 12 in any position of orientation about 360 degrees of circular angulation or spherical attitude and voids any need for gravity to assist in returning the plunger 42 to a deenergized position. It should be noted that one 41 of the studs 38 best seen in FIG. 1 has a threaded portion that extends on both sides of its connection with the solenoid mounting bracket 34. Disposed against an inner side of the bracket 34 is an adjustable stop means 43 that may be moved inwardly or outwardly along the stud When it is determined that the solenoid 40 is disposed upon the studs 38 in a position of desired balance so as to minimize buzzing noise of the solenoid in an energized condition, the locknut 39 on the stud which includes the adjustable stop means 43 is tightened against the outer side of the bracket 34. In this way, the solenoid 40 is adjustably positioned upon the mounting studs 38 and avoids excessive noise that emanates from the solenoid while energized A plurality of stud members 44 are secured to and extend outwardly from the end plate 14 and have threaded portions 46 located on their outer ends. A support lever 48 has formed adjacent one 50 of its ends a plurality of apertures 52 somewhat larger in diameter than the stud members 44 and adapted to fit over and thereabout. The support lever 48 has its one end 50 positioned in a bearing relationship against outwardly extending arms 54 of a bearing plate 56 that is secured by suitable means to the end plate 14.

The ends of arms 54 of bearing plate 56 are formed having a slight radial surface 58 so that the lever 48 may pivot thereon The lever 48 is maintained in bearing relationship with the arms 54 of bearing plate 56 by compression springs 60 disposed over and about the studs 44 and adjustably secured thereat by locknuts 62. It will be seen that the lever 48 is urged toward the end plate 14 by the force of compression springs 60. It will be seen further that the force of compression springs 60 adjacent the end 50 of the lever 48 causes the end to pivot on the arms 54 of the bearing plate 56 and urges the lever 48 toward the end plate 14. The support lever 48 has located at its other end 64 bracket means 66 for receiving and maintaining therein in pivotal relationship the plunger 42 of the solenoid 40. Transverse screw means 68 serves to maintain the bracket means 66 of the lever 48 assembled to the plunger 42 of the solenoid 40.

The lever dimensions and fulcrum pivot point are chosen to provide a relatively low brake release mechanical advantage of only 7 to 1. The spring-set mechanical advantage is disposed to provide approximately 7½ to 1, thus ensuring that the lever 48 always maintains contact with the pivot bearing plate 56. A suitable hole 70 is located in the lever 48 so as to provide access to accommodate any extended length of the shaft 18, and should the need arise, to permit removal and replacement of an extended shaft from the motor.

A brake shoe 72 has formed therein apertures 74 having diameters adapted to fit loosely over and about inner nonthreaded portions of the stud members 44 and is disposed between the support lever 48 and the friction disc 28 in a manner that urges a portion of the friction disc 28 against the end plate 14 so as to prevent rotation of the hub 20 and shaft 18 during brake engagement. A wear adjustment screw 76 extends through the lever 48 in threaded engagement therewith and has a first end 78 disposed in bearing engagement with the brake shoe 72 substantially intermediate its ends. The second end 80 of the wear adjustment screw 76 has slot means 82 adaptable to receive a screw driver or other implement for rotating and moving the screw inwardly against the brake shoe to compensate for frictional disc wear.

An anti-rattle leaf spring 84 is disposed between the bearing plate 56 and the end plate 14 and has outwardly extending end portions 86 that provide spring bearing forces against the inner surface 88 of the brake shoe 72 at its outer ends 90 The anti-rattle leaf spring 84 serves to urge the brake shoe 72 away from the friction disc 28 during disengagement so as to suppress undesirable noise The anti-rattle leaf spring is especially useful and effective when the brake is mounted directly over and above a motor shaft. In such an arrangement, the anti-rattle leaf spring 84 lifts the brake shoe 72 up and away from the friction disc 28 to prevent brake drag.

Additional noise suppression means is provided in the form of a hub stabilizing spring means 92 disposed between an outer edge of one of the teeth 22 of the hub 20 and an inner radial surface 94 of the friction disc 28. The stabilizing spring means 92 serves to eliminate backlash noise that occurs between the hub 20 and the friction disc 28 when the motor is started and stopped.

A manual brake release lever 96 is rotatably secured in a support bracket 98 secured to an outer end portion of the end plate 14. The release lever 96 has an exterior arm 100 adaptable for rotation manually. The release lever 96 has an interior U-shaped portion 102 adaptable when rotated by the exterior arm 100 to move against the bracket means 66 of the support lever 48 and urge it outwardly away from the end plate 14. Detent means 104 is provided in the form of a groove or recess 106 in a surface of the bracket means 66 of the support lever 48 to receive and maintain therein the U-shaped portion 102 of the release lever 96 when the support lever 48 is pivoted to a position that permits release of the brake shoe 72 from the friction disc 28 so that the motor shaft is free to rotate. When the solenoid 40 is energized and the plunger 42 is urged outwardly, the support lever 48 is moved away from the end plate 14 so that the release lever 96 loses contact with the detent 106 of the support lever bracket means 66. When this occurs, a torsion spring 108 disposed at an end opposite from the exterior arm 100 of the release lever 96 is effective to rotate the release lever 96 back to its original position.

Positive stop means 110 forms a part of and extends outwardly from the manual brake support bracket 98 for at times receiving in engagement the inner side of the support lever bracket means 66. In the event the solenoid 40 is reduced or loses power to the extent that it cannot attract or overcome the force of compression springs 60, the support lever bracket means 66 engages the positive stop means 110. In this position, the support lever 48 will be maintained in a position separated from the hub 20 so as to avoid any interference with the hub as it rotates with the motor shaft 18.

In operation of the present invention the motor 12 and solenoid 40 are preferably wired in a manner whereby energization of the motor simultaneously energizes the solenoid. Energization of the solenoid 40 pulls the lever 48 away from the end plate 14 against the urging of compression springs 60. The lever 48 pivots on the radial surfaces 58 of the bearing plate 56 in a clockwise direction as viewed in FIG. 1 thereby permitting the brake shoe 72 to be released from engagement from the friction disc 28. The anti-rattle leaf spring 84 assists in moving the brake shoe 72 out of engagement with the friction disc and maintains the brake shoe 72 in a released position to avoid intermittent contact between the brake shoe 72 and the friction disc 28 that could result in undesirable rattle-type noise.

When the motor and solenoid are deenergized, the force of compression springs 60 moves the support lever 48 toward the end plate 14 causing the brake shoe 72 to engage or clamp the friction disc 28 against the end plate 14 with sufficient force to frictionally stop the motor shaft. A braking force is then exerted upon the motor 12 or load by clamping the rotating friction disc 28 between the stationary surface of the end plate 14 and the brake shoe 72 which is held in the clamping position by contact with the wear adjusting screw 76 secured by threaded engagement as described hereinabove with the support lever 48. Contact pressure is provided by the compression pressure springs 60 disposed on the stud members 44 secured to the end plate 14 and held in compression by the locknuts 62 and the actuating support lever 48.

Clockwise rotation of the wear adjustment screw 76 causes increased compression of the compression springs 60 and thus increases contact pressure against the brake shoe 72 with resultant greater braking torque. It should be noted that rotation of the adJustment screw 76 also compensates for wear experienced by the friction disc 28. This single adjustment of both wear and braking torque by the screw 76 eliminates interaction between the two adjustments and is a unique feature of this invention. Adjustment to provide various torque ratings is accomplished by the locknuts 62, movement thereof along stud members 44 being effective to vary the compression exerted by the pressure of springs 60.

Various torque ranges (up to 3 lb.-Ft.) may be obtained by use of interchangeable compression springs 60 and solenoid coils having different ratings. As much as a 6 lb. ft. rating may be obtained by use of larger but interchangeable springs, solenoids, coils and associative parts.

When the solenoid 40 is energized and the plunger 42 is attracted, the support lever 48, being hinged by its bracket means 66 to the plunger 42, pivots on its fulcrum at the bearing plate 56 and releases the clamping pressure on the brake shoe 72 by overcoming the urging of the compression springs 60. During the time the brake is released, the brake shoe 72 is urged by the anti-rattle leaf spring 84 to slide along the axis of the stud members 44 so as to maintain contact with the adjusting screw 76 and thus prevent it from rattling against the friction disc and producing noise.

The low mechanical advantage of the support lever 48 ensures that the solenoid plunger 42 will return to its de-energized position without the aid of gravity, allowing complete freedom from any restrictive mounting orientation position. This permits the brake mechanism to be mounted on a motor in any position of orientation about 360 degrees of either circular angulation or spherical attitude Final desired setting of the solenoid air gap is accomplished by "fine tuning" the position of the wear adjustment screw 76 In comparison with prior art devices that employed mechanical advantage of about 20-1, the present invention operates at a 7 to 1 mechanical advantage and permits at least 3½ times the amount of wear before requiring adjustment of torque by the wear adjustment screw 76. Accordingly, in the present invention, cycles of operation increase more than 3½ fold before any need arises to adjust solenoid air gap.

It should be noted that proper setting of the solenoid air gap is essential to efficient operation of a brake mechanism of the type herein described If the solenoid air gap setting is spaced too widely apart, torque forces will not be strong enough to exert sufficient clamping pressure against the frictional disc and the end plate in order to stop rotation of the shaft. Preferably, a solenoid air gap setting of ⅛ inch provides sufficient torque to achieve a desired clamping pressure. As hereinbefore described, the wear adjustment screw 76 is adaptable to "fine tune" the application of torque in conjunction with a preferred setting of ⅛" solenoid air gap.

Prior art devices typically employed an air gap setting of 9/32" and would be re-set when the gap reached ⅜". Using a mechanical advantage of 20 to 1, the air gap change of 3/32" divided by 20 equals 0.005 friction disc wear. The present invention employs an air gap setting of ⅛" and is re-set when the gap reaches ¼". However, because of the significantly lower mechanical advantage of 7 to 1, air gap change of ⅛" translates into a factor of about 0.018 friction disc wear. Accordingly, the present invention achieves a distinct advantage over the prior art by permitting at least 3.6 times as much wear before requiring adjustment of torque. In other words, it is possible to obtain an increase of more than 3½ times the cycles of operation before the need arises to adjust torque by "fine tuning" the adjustment screw 76.

Accordingly, the significantly lower mechanical advantage utilized in the present invention is effective to achieve more than 3½ times of efficient operating life cycles before it is necessary to make an adjustment of torque forces by moving the screw 76 to an alternate position.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims

We claim:

1. An improved brake mechanism for selective stopping and permitting rotation of a shaft journaled in a motor frame comprising friction disc means secured to said shaft for rotation therewith end plate means secured to the motor frame and having a disc engaging surface, non-rotatable brake shoe means mounted for movement toward and away from said disc means, bearing plate means disposed radially outwardly from said brake shoe means between outer ends thereof and secured to said end plate means on an outermost circumferential surface thereof, support lever means having one end pivotally abutting against said bearing plate means, compression spring means disposed adjacent said one end of said support lever means for urging said lever means against said bearing plate means, said compression spring means being adaptable to be interchanged with compression spring means having different torque ratings, adjustment means disposed adjacent said one end of said support lever means having an inner end urging said brake shoe means against said friction disc means, solenoid means directly secured to said end plate means on an outermost circumferential surface thereof diametrically opposite from said bearing plate means, said solenoid means being adaptable to be interchanged with solenoid means having different torque ratings, and reciprocally movable plunger means of said solenoid means pivotally connected to said support lever means at its other end, said plunger means being adaptable to return to a deenergized position without the aid of gravity so that said end plate means may be mounted on the motor frame in any preselected position of circular angulation thereabout whereby energization of said solenoid means is effective to permit rotation of said shaft and deenergization of said solenoid means is effective to stop rotation of said shaft.

2. The brake mechanism of claim 1 wherein said adjustment means is a single adjustment screw threaded through said support lever and adjustable to compensate for frictional wear between said braking surface of said end plate and said friction disc.

3. The brake mechanism of claim 1 wherein said adjustment means is a single adjustment screw threaded through said support lever and being effective to finely adjust for brake applying force.

4. The brake mechanism of claim 1 wherein said compression spring means comprises a plurality of helical springs retained by locknut means against said support lever means adjacent said one end thereof, whereby said support lever means is pivotally urged about said bearing plate means toward said end plate means.

5. The brake mechanism of claim 4 wherein said plurality of helical springs are effective to provide uniform application of torque force to said support lever means.

6. The brake mechanism of claim 1 comprising anti-rattle leaf spring means disposed between said end plate means and said brake shoe means for urging said brake shoe means away from said friction disc means so as to suppress noise during disengagement therebetween.

7. The brake mechanism of claim 1 comprising hub stabilizing means disposed between a tooth of a hub secured to said motor shaft and an inner radial surface of said friction disc means.

8. The brake mechanism of claim 1 including manual brake release means secured to said end plate means comprising exterior arm means adaptable for rotation, interior U-shaped means adaptable when rotated manually by said exterior arm means to contact said other end of said support lever means and urge it outwardly away from said end plate means to disengage said brake shoe means from said friction disc, and torsion spring means disposed at an end opposite from said exterior arm means, said torsion spring means being effective when said solenoid is energized to rotate said U-shaped means out of contact with said other end of said support lever means so as to permit disengagement between said brake shoe means and said friction disc.

9. The brake mechanism of claim 1 wherein said support lever means pivoted about said bearing plate means by the force of said compression spring means achieves a mechanical advantage of substantially 7 to 1.

10. The brake mechanism of claim 1 wherein said support lever means pivoted about said bearing plate means by the force of energization of said solenoid achieves a mechanical advantage of substantially 7½ to 1.

11. The brake mechanism of claim 1 comprising positive stop means secured to said end plate means for receiving said other end of said support lever means when said solenoid is in a reduced power condition.

12. The brake mechanism of claim 1 wherein said solenoid is secured to said end plate means by a plurality of mounting studs and a mounting bracket, including adjustable stop means disposed about one of said mounting studs and reciprocally movable thereon, whereby said solenoid is positioned upon said mounting studs by said adjustable stop means so as to avoid excessive buzzing noise of the solenoid 13. The brake mechanism of claim 1 wherein said adjustment means is effective to maintain an air gap setting of the solenoid between ⅛ and ¼ inches whereby cycles of operation are greatly increased between movements of said adjustment means.

14. The brake mechanism of claim 13 wherein said support lever means pivoted about said bearing plate means by said compression spring means permits said cycles of operation to increase more than three and one half times before the need arises to adjust the air gap setting of the solenoid by said adjustment means.

15. The brake mechanism of claim 1 wherein the brake mechanism is mounted directly over and above the motor shaft.

16. An improved brake mechanism for selective stopping and permitting rotation of a shaft journaled in a motor frame comprising friction disc means secured to said shaft for rotation therewith end plate means secured to the motor frame and having a disc engaging surface, non-rotatable brake shoe means mounted for movement toward and away from said disc means, bearing plate means disposed radially outwardly from said brake shoe means between outer ends thereof and secured to said end plate means on an outermost circumferential surface thereof, support lever means having one end pivotally abutting against said bearing plate means, compression spring means disposed adjacent said one end of said support lever means for urging said lever means against said bearing plate means, said compression spring means being adaptable to be interchanged with compression spring means having different torque ratings, adjustment means disposed adjacent said one end of said support lever means having an inner end urging said brake shoe means against said friction disc means, solenoid means directly secured to aid end plate means on an outermost circumferential surface thereof diametrically opposite from said bearing plate means, said solenoid means being adaptable to be interchanged with solenoid means having different torque ratings, reciprocally movable plunger means of said solenoid means pivotally connected to said support lever means at its other end, said plunger means being adaptable to return to a deenergized position without the aid of gravity so that said end plate means may be mounted on the motor frame in any preselected position of circular angulation thereabout whereby energization of said solenoid means is effective to permit rotation of said shaft and deenergization of said solenoid means is effective to stop rotation of said shaft, and said compression spring means and said solenoid means are effective to obtain brake applying force range ratings to substantially six pound feet.

17. The brake mechanism of claim 16 wherein said adjustment means is a single adjustment screw threaded through said support lever and adjustable to compensate for frictional wear between said braking surface of said end plate and said friction disc.

18. The brake mechanism of claim 16 wherein said adjustment means is a single adjustment screw threaded through said support lever and being effective to finely adjust for brake applying force.

19. The brake mechanism of claim 16 wherein said compression spring means comprises a plurality of helical springs retained by locknut means against said support lever means adjacent said one end thereof, whereby said support lever means is pivotally urged about said bearing plate means toward said end plate means.

20. The brake mechanism of claim 19 wherein said plurality of helical springs are effective to provide uniform application of torque force to said support lever means.

21. The brake mechanism of claim 16 comprising anti-rattle leaf spring means disposed between said end plate means and said brake shoe means for urging said brake shoe means away from said friction disc means so as to suppress noise during disengagement therebetween.

22. The brake mechanism of claim 16 comprising hub stabilizing means disposed between a tooth of a hub secured to said motor shaft and an inner radial surface of said friction disc means.

23. The brake mechanism of claim 16 including manual brake release means secured to said end plate means comprising exterior arm means adaptable for rotation, interior U-shaped means adaptable when rotated manually by said exterior arm means to contact said other end of said support lever means and urge it outwardly away from said end plate means to disengage said brake shoe means from said friction disc, and torsion spring means disposed at an end opposite from said exterior arm means, said torsion spring means being effective when said solenoid is energized to rotate said U-shaped means out of contact with said other end of said support lever means so as to permit disengagement between said brake shoe means and said friction disc.

24. The brake mechanism of claim 16 wherein said support lever means pivoted about said bearing plate means by the force of said compression spring means achieves a mechanical advantages of substantially 7 to 1.

25. The brake mechanism of claim 16 wherein said support lever means pivoted about said bearing plate means by the force of energization of said solenoid achieves a mechanical advantage of substantially 7½ to 1.

26. The brake mechanism of claim 16 comprising positive stop means secured to said end plate means for receiving said other end of said support lever means when said solenoid is in a reduced power condition.

27. The brake mechanism of claim 16 wherein said solenoid is secured to said end plate means by a plurality of mounting studs and a mounting bracket, including adjustable stop means disposed about one of said mounting studs and reciprocally movable thereon, whereby said solenoid is positioned upon said mounting studs by said adjustable stop means so as to avoid excessive buzzing noise of the solenoid.

28. The brake mechanism of claim 16 wherein said adjustment means is effective to maintain an air gap setting of the solenoid between ⅛ and ¼ inches whereby cycles of operation are greatly increased between movements of said adjustment means.

29. The brake mechanism of claim 28 wherein said support lever means pivoted about said bearing plate means by said compression spring means permits said cycles of operation to increase more than three and one half times before the need arises to adjust the air gap setting of the solenoid by said adjustment means.

30. The brake mechanism of claim 16 wherein the brake mechanism is mounted directly over and above the motor shaft.

* * * * *